July 13, 1954  C. H. HERR, JR  2,683,634
HINGE JOINT FOR TRACK SUPPORTING SWING FRAMES
Filed Sept. 4, 1952  2 Sheets-Sheet 1

Inventor
Charles H. Herr, Jr.
by  Attorney

July 13, 1954   C. H. HERR, JR   2,683,634
HINGE JOINT FOR TRACK SUPPORTING SWING FRAMES
Filed Sept. 4, 1952   2 Sheets-Sheet 2

Inventor
Charles H. Herr, Jr.
by W. Zierold
Attorney

Patented July 13, 1954

2,683,634

UNITED STATES PATENT OFFICE 2,683,634

HINGE JOINT FOR TRACK SUPPORTING SWING FRAMES

Charles H. Herr, Jr., Springfield, Ill., assignor to Allis-Chalmers Manufacturing Company, Milwaukee, Wis.

Application September 4, 1952, Serial No. 307,823

2 Claims. (Cl. 305—9)

This invention relates to hinge joints, and it is concerned more particularly with an improved joint for connecting the swing frame of a crawler tractor to the tractor main body.

In the construction of crawler tractors it is usual to pivot the swing or track frames on a rearward transverse axis coaxially with the track belt driving sprockets. Each of the two track frames is provided, in the usual construction, with a forked rear end presenting an outer leg and an inner leg for stabilizing the track frame against lateral displacement relative to the tractor body. It is old in the art to swingingly mount these inner legs at the rearward underside of the transmission housing, but under certain conditions, the hinge pin mountings employed for that purpose have been found not entirely satisfactory due to space limitations. Under those conditions difficulties have been encountered in providing a satisfactory hinge pin mounting, particularly in the matter of avoiding interference with vital parts whose location cannot readily be changed, such as the power transmitting gearing and steering clutches of the tractor.

Generally, it is an object of the invention to provide an improved hinge joint which lends itself to installation in close quarters.

More specifically, it is an object of the invention to provide an improved hinge joint for use in mounting a track frame on the transmission and steering clutch housing of a crawler tractor, and which hinge joint requires less mounting space, transversely and vertically of the tractor, than is required by hinge joints of conventional construction.

A further object of the invention is to provide an improved hinge joint of the hereinabove outlined character which will give satisfactory service under severe operating conditions incident to heavy duty use, and which may readily be serviced, when necessary, without need for other than ordinary and commonly available tools.

These and other objects and advantages are attained by the present invention, novel features of which will be apparent from the disclosure herein and accompanying drawings disclosing an embodiment of the invention, and will be more particularly pointed out in the appended claims.

Figure 1:
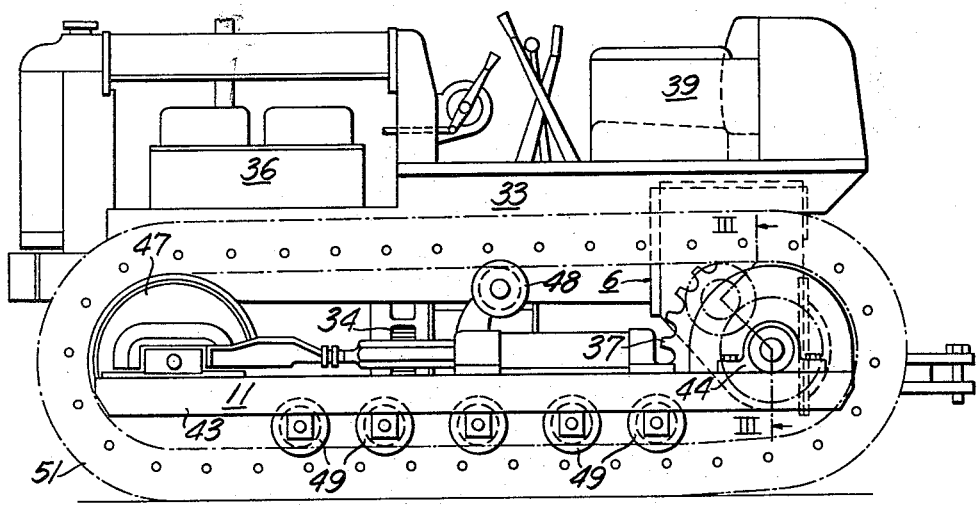
Fig. 1 is a side view of a crawler tractor.
Figure 2:
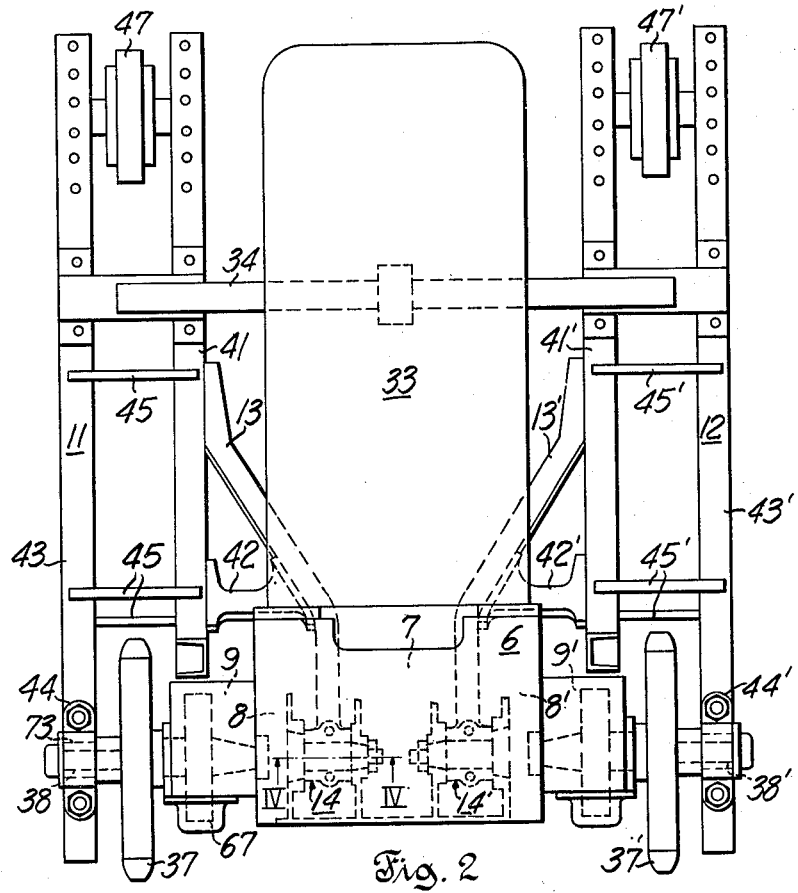
Fig. 2 is a generally schematic top view of the tractor shown in Fig. 1 with the track belts omitted for purposes of exposure.

The crawler tractor shown in Figs. 1 and 2 has a multicompartment transmission housing 6 including a central wet compartment 7, lateral steering clutch compartments 8 and 8′ and final drive compartments 9 and 9′. Running gear for the crawler tractor includes a forked swing frame 11 straddling the final drive compartment on the left side of the tractor, and another forked swing frame 12, which is an opposite hand duplicate of the swing frame 11 and straddles the other final drive compartment. The swing frames 11 and 12 have inner legs 13 and 13′, respectively, which are secured at their rearward ends to the underside of the transmission housing 6 by hinge joints 14 and 14′. Each of the two hinge joints as shown schematically in Fig. 2 and as more clearly shown in Figs. 3, 4 and 5, comprises a hinge pin 16 having a shank portion 17 extending through the rearward end of the inner leg of the respective swing frame. Referring to Fig. 4, the hinge pin 16 has a conical shoulder 18 formed at one end of the shank portion 17, and a conical face 19 at the other end of the shank portion 17. The conical shoulder 18 and the conical face 19 taper axially toward the right end of the hinge pin, as viewed in Fig. 4, on which end the conical face 19 is formed. The base diameter D of the conical face 19 is considerably smaller than the smallest diameter $d$ of the conical shoulder 18. The hinge joint 14 for the arm 13 of the left track frame 11 is mounted on a pair of housing walls, namely, a dry compartment wall 21 and a wet compartment wall 22, which are laterally spaced from each other and rigidly interconnected by a top wall 25. As best shown in Fig. 4, the dry compartment wall 21 has a first conical bore 23 which is complementary to the conical shoulder 18 of the hinge pin 16. The wet compartment wall 22 has a second conical bore 24 which is complementary to the conical face 19 of the hinge pin 16 and which is disposed in axially aligned relation to the first conical bore 23. The surfaces of said first and second conical bores, 23 and 24, are identically inclined relative to the axis of the hinge joint, as indicated by dash-dotted lines $x$—$x'$ and $y$—$y'$, and both bores have a common apex at a point indicated by reference character 30 on the hinge joint axis. Each of the hinge joints 14 and 14′ also comprises a releasable fastening means 26 which maintains the conical shoulder 18 and the conical face 19 of the hinge pin 16 in wedging engagement with the first and second conical bores 23 and 24, respectively. As shown in Fig. 4, the releasable fastening means 26 comprises a threaded stud 27 formed on the hinge pin 16 axially adjacent the conical face 19, a nut 28 cooperatively engaging the threaded stud 27 and a washer 29 interposed between the nut 28 and a surface 31 of the wet compartment wall 22. By tightening the nut 28 on the threaded stud 27, thrust is transmitted from the nut to surface 31 of the wet compartment wall 22 through washer 29, and the conical shoulder 18 and the conical face 19 are thereby drawn into fluid tight wedging engagement with the conical bores 23 and 24, respectively. A cotter pin 32 is provided to lock the nut 28 on the threaded stud 27. Use of the cotter pin 32 provides releasable locking means for preventing relative rotation between the nut 28 and the threaded stud 27.

The crawler tractor shown in Figs. 1 and 2 is of the three point suspension type having a main body 33, a pair of forked swing frames 11 and 12 swingably mounted on a transverse pivot axis at the rear of the main body and an equalizer spring 34 operatively interposed between the forked swing or track frames 11 and 12 and the main body 33. The main body 33 has a power unit 36 at its front end, a multicompartment transmission housing 6 at its rear end, a pair of driving sprockets 37 and 37' attached to driving sprocket shafts 38 and 38', respectively, extending laterally of the transmission housing on the transverse pivot axis. An operator's station 39 is provided above the transmission housing 6.

In the construction of the forked swing frames 11 and 12, inner legs 13 and 13' are secured at their forward ends to inner channels 41 and 41', respectively, and braces 42 and 42' are attached to the inner legs 13 and 13' and the inner channels 41 and 41'. Outer channels 43 and 43' are pivotally mounted on the driving sprocket shafts 38 and 38' by bearing brackets 44 and 44'. The outer channels and inner channels are spaced apart by braces 45 and 45'. Track idlers 47 and 47' are pivotally mounted between the inner channels 41, 41' and outer channels 43, 43' of the swing frames 11 and 12.

Referring to Fig. 1, the left swing frame is shown to have a support roller 48 pivotally mounted on a bracket attached to the upper part of the channels 41 and 43 and truck wheels 49 pivotally mounted on supports attached to the underside of said channels. The track idler 47, support roller 48, driving sprocket 37, and truck wheels 49 support a self-laying track 51 of conventional construction, shown schematically. These explanations similarly apply to the right track unit.

Figure 3:
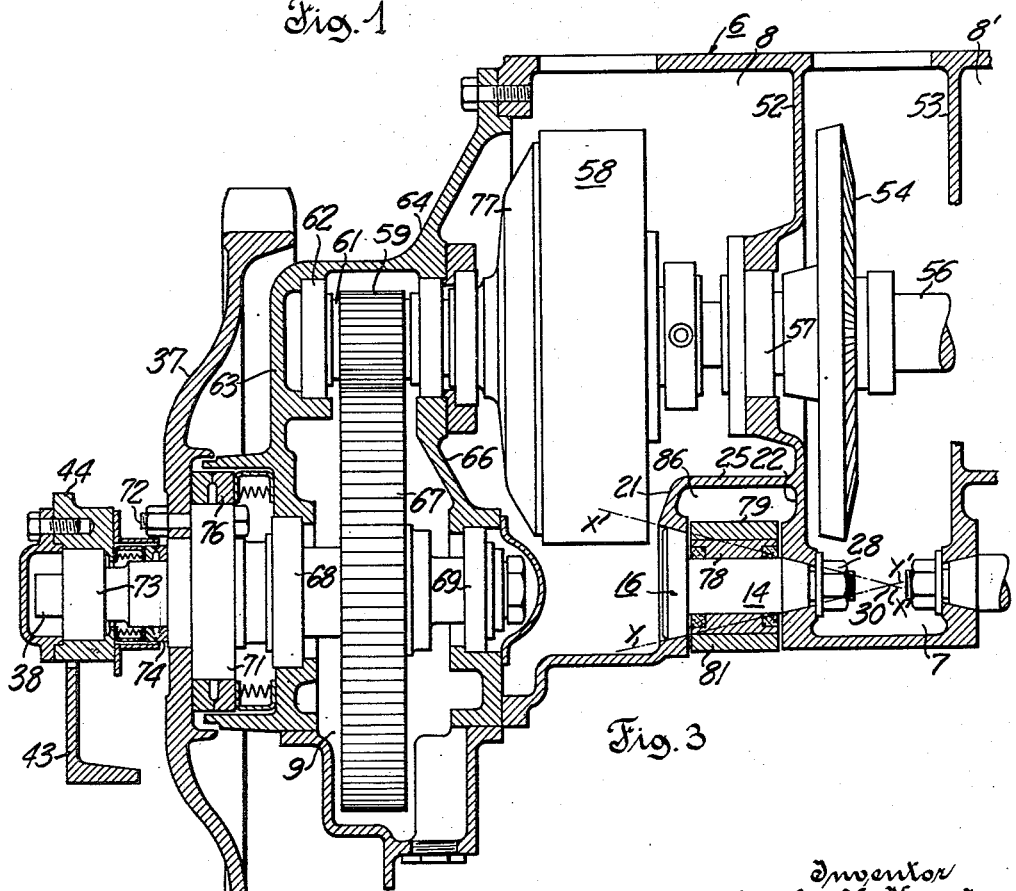
Fig. 3 is an enlarged sectional view on line III—III of Fig. 1.
Figures 4, 5:
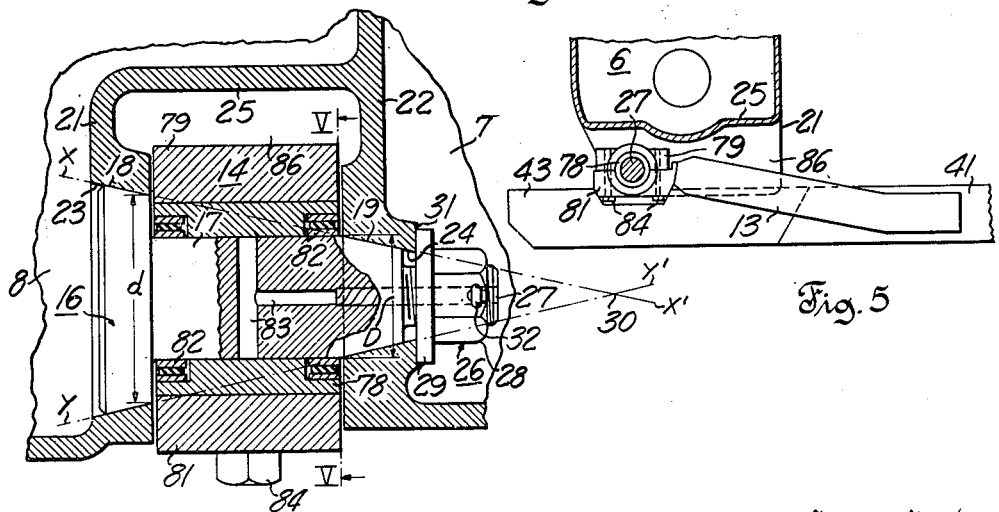
Fig. 4 is an enlarged sectional view on the line IV—IV of Fig. 2.
Fig. 5 is a sectional view, at a reduced scale, taken on the line V—V of Fig. 4.

The environment of the hinge joints can best be ascertained by reference to Fig. 3. Since the two hinge joints are opposite hand duplicates of one another, only one is fully shown.

The transmission housing 6 is divided by walls 52 and 53 into a central bevel gear compartment 7 and two lateral steering clutch compartments 8 and 8', one at each side of the bevel gear compartment. Compartment 7, being filled with lubricant, constitutes a wet compartment and houses a driving pinion, not shown, which is driven through gearing, not shown, by the power unit 36, and a bevel gear 54 secured to a steering clutch shaft 56 which is journaled by bearing 57 and another bearing, not shown, in compartment walls 52 and 53, respectively. Each of the steering clutch compartments is a dry compartment and houses a steering clutch 58 of conventional construction. Final drive compartments 9 and 9' are formed at the axially outer sides of the steering clutch compartments 8 and 8', respectively. Within each of the final drive compartments 9 and 9', a final drive pinion 59 is secured to a shaft 61 for rotation therewith. The shaft 61 is mounted in the final drive compartment 9 by a bearing 62 bracketed in the outside wall 63 and by a bearing 64 mounted in the inside wall 66. A final drive gear 67 meshes with the final drive pinion 59 and is secured to the driving sprocket shaft 38 for rotation therewith. The sprocket drive shaft 38 is journaled for rotation in a bearing 68 and in a bearing 69 in the final drive compartment walls 63 and 66, respectively.

On the axially outward extending portion of the sprocket drive shaft 38, a hub 71 is splined for rotation therewith. The driving sprocket 37 is secured to hub 71 by a plurality of bolt and nut means 72. The axially outer end of the sprocket drive shaft 38 is journaled in a bearing 73 which is mounted in the bracket 44 attached to the outer channel 43 of the swing frame. Axial contact type seals 74 and 76 are provided to prevent escape of oil from the final drive compartment 9.

Before installing or removing the hinge pin 16, the final drive compartment 9 must be removed from the remainder of the transmission housing and the outer portion 77 of the steering clutch 58 must be removed from the steering clutch compartment 8. It is then possible to install the hinge pin or to withdraw the hinge pin upon release of the nut 28.

Referring to Fig. 4, a bearing bushing 78 surrounding the shank portion 17 of the hinge pin 16 is embraced by a top portion 79 and a bottom portion 81 of a bearing block on the rearward end of the inner leg 13 of the forked swing frame 11. Oil seals 82 are provided to prevent leakage of oil from the hinge joint. Conduit means 83 are provided to supply the radially inner surface of the bearing bushing 78 and the cylindrical surface of pivot shank 17 with lubricant from the central wet compartment 7.

Referring to Fig. 5, the upper portion or cap 79 of the bearing block is fastened to the lower portion 81 of the bearing block by two stud bolts 84. Lower portion 81 is welded to a strut which forms the main part of the inner leg 13. A tunnel 86, defined by walls 21, 22 and 25, is provided in the underside of the transmission housing 6 to provide adequate vertical clearance for upward swinging movement of the inner leg 13 of swing frame 11 relative to the transmission housing 6.

The hinge joint as shown and described herein provides a satisfactory connection for an inner leg of a swing frame in a confined space on the underside of a tractor main body. It is evident from the foregoing disclosure that the hinge joint does not interfere with the steering clutches or power transmitting gearing of the tractor and that the hinge pin of the hinge joint engages the interconnected transmission housing walls to form a fluid tight fit preventing escape of lubricating oil from the central wet compartment. It is further evident that the hinge joint may readily be serviced, when necessary, without need for other than ordinary and commonly available tools. Further, the hinge joint is designed so as to give satisfactory service under severe operating conditions incident to heavy duty use.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a hinge joint for securing a track supporting swing frame to the transmission housing of a crawler tractor, the combination of a pair of transversely and fixedly spaced wall members, one forming a side portion of a clutch compartment of said transmission housing and having a first conical transverse bore, and the other of said wall members forming a side portion of a lubricant containing bevel gear compartment of said transmission housing and having a second conical transverse bore coaxial with and formed on the same conical taper as that of said first bore; a hinge pin having a shank portion adapted for connection in rotatable and radial load transmitting relation with an inner leg of said swing frame; a conical shoulder complementary to and seated in said first conical bore, formed at one end of said shank portion; a conical face complementary to and seated in said second conical bore, formed at the other end of said shank portion; said conical shoulder and said conical face tapering axially toward said other end of said shank portion; a threaded stud formed on and extending axially from said conical face of said hinge pin into said lubricant containing bevel gear compartment; and a nut cooperatively engaging said threaded stud and associated with said other of said wall members so as to maintain said conical shoulder and conical face in wedging engagement with said first and second conical bores, respectively.

2. A hinge joint as set forth in claim 1 having a washer surrounding said threaded stud and interposed between said nut and said other of said wall members and releasable locking means for preventing relative rotation between said nut and said threaded stud.

References Cited in the file of this patent
UNITED STATES PATENTS

| Number | Name | Date |
|---|---|---|
| 914,683 | Ward | Mar. 9, 1909 |
| 987,853 | Bryan | Mar. 28, 1911 |
| 1,820,638 | Tower | Aug. 25, 1931 |
| 2,049,672 | Starr | Aug. 4, 1936 |
| 2,146,169 | Baker et al. | Feb. 7, 1939 |
| 2,297,485 | Lentz | Sept. 29, 1942 |